US009781199B2

(12) United States Patent
Choi et al.

(10) Patent No.: US 9,781,199 B2
(45) Date of Patent: *Oct. 3, 2017

(54) MANAGED PEER-TO-PEER SHARING IN CELLULAR NETWORKS

(71) Applicant: BlackBerry Limited, Waterloo (CA)

(72) Inventors: Noun Choi, Flower Mound, TX (US); Wei Wu, San Jose, CA (US); Khiem Le, Coppell, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,906

(22) Filed: Dec. 28, 2015

(65) Prior Publication Data
US 2016/0150005 A1 May 26, 2016

Related U.S. Application Data

(63) Continuation of application No. 13/400,755, filed on Feb. 21, 2012, now Pat. No. 9,231,786.

(51) Int. Cl.
*G06F 15/16* (2006.01)
*H04L 29/08* (2006.01)
(Continued)

(52) U.S. Cl.
CPC .......... *H04L 67/1061* (2013.01); *H04L 12/66* (2013.01); *H04L 67/104* (2013.01);
(Continued)

(58) Field of Classification Search
CPC .. H04L 67/104; H04L 12/66; G06F 17/30206
(Continued)

(56) References Cited

U.S. PATENT DOCUMENTS 7,533,141 B2 * 5/2009 Nadgir .................. G06F 9/5072
370/395.1
7,783,777 B1 * 8/2010 Pabla ................ G06F 17/30206
709/238
(Continued)

FOREIGN PATENT DOCUMENTS

EP 1821487 8/2007
EP 2086206 8/2009
(Continued)

OTHER PUBLICATIONS

International Search Report and Written Opinion issued in International Application No. PCT/US2011/025605, dated Sep. 27, 2011, 9 pgs.
(Continued)

*Primary Examiner* — David Lazaro
*Assistant Examiner* — Vitali Korobov
(74) *Attorney, Agent, or Firm* — Fish & Richardson P.C.

(57) ABSTRACT

A method, system and apparatus are provided for performing peer-to-peer (P2P) data sharing operations between user equipment (UE) devices in a wireless-enabled communications environment. A first client node comprises content data and operates in a server peer mode to provide content data. A second client node submits a request to a P2P application server (P2P AS) for the content data. In response, the P2P AS provides the address of the first client node to the second client node. The second client node then uses the provided address to submit a request to the first client node to provide the content data. The first client node accepts the request and then provides the content data to the second client node.

17 Claims, 8 Drawing Sheets

(51) Int. Cl.
*H04L 12/66* (2006.01)
*H04W 60/00* (2009.01)

(52) U.S. Cl.
CPC ...... *H04L 67/1063* (2013.01); *H04L 67/1072* (2013.01); *H04W 60/00* (2013.01)

(58) Field of Classification Search
USPC ........................................ 709/200, 205, 230
See application file for complete search history.

(56) References Cited

U.S. PATENT DOCUMENTS

| | | | | |
|---|---|---|---|---|
| 7,886,033 | B2* | 2/2011 | Hopmann | H04L 12/2807 |
| | | | | 370/401 |
| 7,899,017 | B2* | 3/2011 | Yu | H04W 48/18 |
| | | | | 370/338 |
| 8,478,849 | B2* | 7/2013 | Marl | H04L 12/2807 |
| | | | | 709/223 |
| 8,724,515 | B2* | 5/2014 | Averbuch | H04L 41/0806 |
| | | | | 370/255 |
| 9,231,786 | B2* | 1/2016 | Wu | H04L 67/104 |
| 9,356,997 | B2* | 5/2016 | Chaturvedi | H04L 67/1097 |
| 2003/0115283 | A1* | 6/2003 | Barbir | H04L 29/06 |
| | | | | 709/217 |
| 2004/0148326 | A1* | 7/2004 | Nadgir | G06F 9/5072 |
| | | | | 709/200 |
| 2007/0064702 | A1* | 3/2007 | Bates | H04L 45/02 |
| | | | | 370/392 |
| 2009/0006853 | A1* | 1/2009 | Li | H04L 63/0428 |
| | | | | 713/176 |
| 2009/0265473 | A1* | 10/2009 | Hydrie | H04L 67/104 |
| | | | | 709/229 |
| 2010/0277294 | A1* | 11/2010 | Tajima | G06F 1/266 |
| | | | | 340/538 |
| 2011/0137991 | A1* | 6/2011 | Russell | G06Q 10/06 |
| | | | | 709/204 |
| 2012/0206557 | A1* | 8/2012 | Ridges | H04N 21/41407 |
| | | | | 348/14.02 |
| 2012/0254338 | A1* | 10/2012 | Agarwal | H04W 40/246 |
| | | | | 709/208 |
| 2013/0111038 | A1* | 5/2013 | Girard | H04L 69/16 |
| | | | | 709/226 |

FOREIGN PATENT DOCUMENTS

| | | |
|---|---|---|
| EP | 2200248 | 6/2010 |
| JP | 2005-149040 | 6/2005 |
| JP | 2008-294648 | 12/2008 |
| JP | 2010-157016 | 7/2010 |
| JP | 2011-014022 | 1/2011 |
| WO | 2009071971 | 6/2009 |
| WO | 2012115616 | 8/2012 |

OTHER PUBLICATIONS

3GPP 23.203, "Policy arid charging control architecture," v9.4.0, Mar. 2010, 123 pages.
3GPP 23.401, "General Packet Radio Service (GPRS) enhancements for Evolved Universal Terrestrial Radio Access Network (E-UTRAN) access," v9.4.0, Mar. 2010, 258 pages.
3GPP TR 22.906, "Study on IMS based Peer-to-Peer Content Distribution Services", v1.0.0, Feb. 2010, 14 pages.
Xie et al., "P4P: Provider portal for P2P applicatons," SIGCOMM '08, Aug. 17-22, 2008, Copyright 2008 ACM, 12 pages.
Communication Pursuant to Article 94(3) EPC issued in European Application No. 11706708.2 dated May 24, 2017.

\* cited by examiner

MANAGED PEER-TO-PEER SHARING IN CELLULAR NETWORKS

CROSS REFERENCE TO RELATED APPLICATIONS

This application is a continuation of U.S. Application Ser. No. 13/400,755, filed on Feb. 21, 2012, now U.S. Pat. No. 9,231,786, the entire contents of which are hereby expressly incorporated by reference herein in their entireties.

BACKGROUND OF THE INVENTION

Field of the Invention

The present invention is directed in general to communications systems and methods for operating same. In one aspect, the present invention relates to a devices and methods for performing peer-to-peer (P2P) data sharing operations between peer nodes in a wireless-enabled communications environment.

Description of Related Art

The technologies currently available for implementation in today's wireless communications environments make it feasible to support bandwidth-intensive content distribution services (CDS) such as video on demand (VoD). As an example, various IEEE 802.11 ("WiFi") variants, which have limited range, currently provide data rates of up to 100 Mbps, while current IEEE 802.16 ("WiMAX") variants currently provide up to 40 Mbps. As another example, Long Term Evolution (LTE) technologies can typically support 5-10 Mbps downlink and 2-5 Mbps uplink data rates. The availability of these data rates, coupled with the widespread adoption of smart phones and other mobile devices, makes the mainstream use of resource-consuming multimedia applications in a mobile environment a reality.

However, the delivery of bandwidth-intensive content is not without attendant issues and challenges. As an example, a mobile subscriber typically establishes a wireless connection between a client node (e.g., a smart phone or other mobile device) and an access node (e.g., a cellular base station or a wireless broadband access point). Once the connection is established, the user typically searches for desired content at a web portal implemented on the Internet or other IP-based network. Once located, the desired content is retrieved from a content source, such as a content data source server that is likewise implemented on the Internet. Once retrieved, the content is then wirelessly transmitted to the requestor's client node.

As a result of this process, it is not uncommon to incur latency during delivery of the content, particularly if the transmission condition of the wireless link being used is not operating at optimum capacity. One approach to this issue is to implement cache servers at predetermined network locations. For example, a content provider may implement cache serves where wireless broadband access networks connect to the Internet. As another example, a wireless provider may implement multiple cache servers in their wireless environment(s) to reduce local network congestion, data transmission transit distances, and content delivery latencies. However, the cost of deploying such cache servers, and keeping the content they contain synchronized, can incur significant operational overhead and associated costs.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
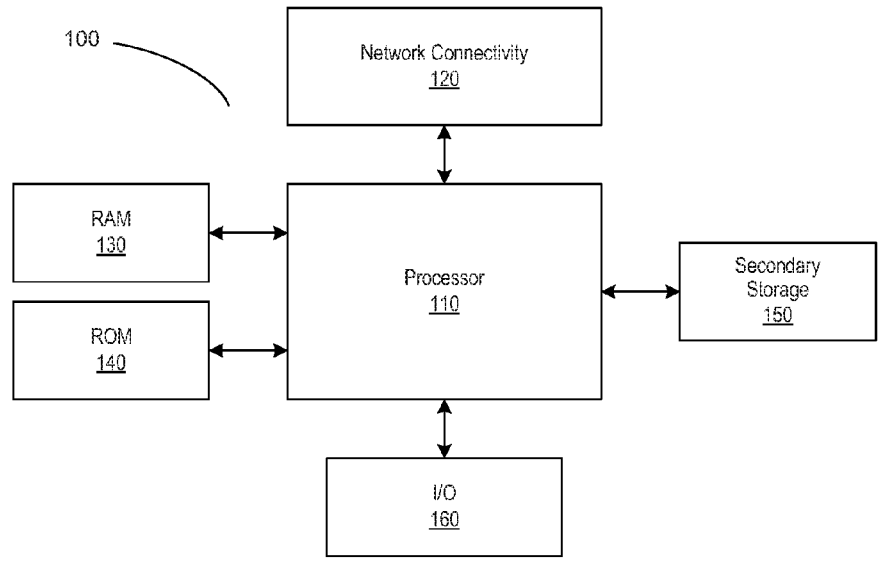
FIG. 1 depicts an exemplary system in which the present invention may be implemented.

A method, system and apparatus are provided for performing peer-to-peer (P2P) data sharing operations between client nodes in a wireless-enabled communications environment. In various embodiments, a first client node comprises content data and operates in a server peer mode to provide content data. A second client node submits a request to a P2P application server (P2P AS) for the content data. In response, the P2P AS provides the address of the first client node to the second client node. The second client node then submits a request to the first client node to provide the content data. The first client node accepts the request and then provides the content data to the second client node.

In one embodiment, a third client node comprises the same content data as the first client node. In this embodiment, the second client node submits a request for the content data to the P2P AS. In response, the P2P AS provides the address of the first client node and the third client node to the second client node. The second client node then uses the address of the first client node to submit a request to the first client node to provide the content data. If the first client node accepts the request, then it provides the requested content data to the second client node. However, if the first client node rejects the request, then the second client node uses the address of the third client node to submit a request for the content data to the third client node. If the third client node accepts the request, then it provides the requested content data to the second client node.

In another embodiment, the second client node concurrently submits request for the content data to the first and third client nodes. If the first client node rejects the request and the third client node accepts the request, then it provides the requested content data to the second client node. In yet another embodiment, the second client node concurrently submits a request for the content data to the first and third client nodes. If the first client node and the third client node both accept the request, then the second client node selects either the first client node or the third client node to provide the content data. The selected client node then provides the requested content data to the second client node.

In yet another embodiment, the P2P AS comprises a content data requestor. In this embodiment, the P2P AS receives a request for the content data from the second client node. In turn, the P2P AS provides the request to the content data requestor. The content data requestor then submits the request, sequentially or concurrently, to the first client node and the third client node as described in greater detail herein. In response, the first client node or the third client node provides the requested content data to the second client node as likewise described in greater detail herein if it accepts the request.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

As likewise used herein, the term "node" broadly refers to a connection point, such as a redistribution point or a communication endpoint, of a communication environment, such as a network. Accordingly, such nodes refer to an active electronic device capable of sending, receiving, or forwarding information over a communications channel. Examples of such nodes include data circuit-terminating equipment (DCE), such as a modem, hub, bridge or switch, and data terminal equipment (DTE), such as a handset, a printer or a host computer (e.g., a router, workstation or server). Examples of local area network (LAN) or wide area network (WAN) nodes include computers, packet switches, cable modems, Data Subscriber Line (DSL) modems, and wireless LAN (WLAN) access points.

Examples of Internet or Intranet nodes include host computers identified by an Internet Protocol (IP) address, bridges and WLAN access points. Likewise, examples of nodes in cellular communication include base stations, base station controllers, home location registers, Gateway GPRS Support Nodes (GGSN), and Serving GPRS Support Nodes (SGSN).

Other examples of nodes include client nodes, server nodes, peer nodes and access nodes. As used herein, a client node may refer to wireless devices such as mobile telephones, smart phones, personal digital assistants (PDAs), handheld devices, portable computers, tablet computers, and similar devices or other user equipment (UE) that has telecommunications capabilities. Such client nodes may likewise refer to a mobile, wireless device, or conversely, to devices that have similar capabilities that are not generally transportable, such as desktop computers, set-top boxes, or sensors. Likewise, a server node, as used herein, refers to an information processing device (e.g., a host computer), or series of information processing devices, that perform information processing requests submitted by other nodes. As likewise used herein, a peer node may sometimes serve as client node, and at other times, a server node. In a peer-to-peer or overlay network, a node that actively routes data for other networked devices as well as itself may be referred to as a supernode.

An access node, as used herein, refers to a node that provides a client node access to a communication environment. Examples of access nodes include cellular network base stations and wireless broadband (e.g., WiMAX, etc) access points, which provide corresponding cell and WLAN coverage areas. As used herein, a macrocell is used to generally describe a traditional cellular network cell coverage area. Such macrocells are typically found in rural areas, along highways, or in less populated areas. As likewise used herein, a microcell refers to a cellular network cell with a smaller coverage area than that of a macrocell. Such micro cells are typically used in a densely populated urban area. Likewise, as used herein, a picocell refers to a cellular network coverage area that is less than that of a microcell. An example of the coverage area of a picocell may be a large office, a shopping mall, or a train station. A femtocell, as used herein, currently refers to the smallest commonly accepted area of cellular network coverage. As an example, the coverage area of a femtocell is sufficient for homes or small offices.

In general, a coverage area of less than two kilometers typically corresponds to a microcell, 200 meters or less for a picocell, and on the order of 10 meters for a femtocell. As likewise used herein, a client node communicating with an access node associated with a macrocell is referred to as a "macrocell client," Likewise, a client node communicating with an access node associated with a microcell, picocell, or femtocell is respectively referred to as a "microcell client," "picocell client," or "femtocell client."

The term "article of manufacture" (or alternatively, "computer program product") as used herein is intended to encompass a computer program accessible from any computer-readable device or media. For example, computer readable media can include but are not limited to magnetic storage devices (e.g., hard disk, floppy disk, magnetic strips, etc.), optical disks such as a compact disk (CD) or digital versatile disk (DVD), smart cards, and flash memory devices (e.g., card, stick, etc.).

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

FIG. 1 illustrates an example of a system 100 suitable for implementing one or more embodiments disclosed herein. In various embodiments, the system 100 comprises a processor 110, which may be referred to as a central processor unit (CPU) or digital signal processor (DSP), network connectivity devices 120, random access memory (RAM) 130, read only memory (ROM) 140, secondary storage 150, and input/output (I/O) devices 160. In some embodiments, some of these components may not be present or may be combined in various combinations with one another or with other components not shown. These components may be located in a single physical entity or in more than one physical entity. Any actions described herein as being taken by the processor 110 might be taken by the processor 110 alone or by the processor 110 in conjunction with one or more components shown or not shown in FIG. 1.

The processor 110 executes instructions, codes, computer programs, or scripts that it might access from the network connectivity devices 120, RAM 130, or ROM 140. While only one processor 110 is shown, multiple processors may be present. Thus, while instructions may be discussed as being executed by a processor 110, the instructions may be executed simultaneously, serially, or otherwise by one or multiple processors 110 implemented as one or more CPU chips.

In various embodiments, the network connectivity devices 120 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks, including Personal Area Networks (PANs) such as Bluetooth. These network connectivity devices 120 may enable the processor 110 to communicate with the Internet or one or more telecommunications networks or other networks from which the processor 110 might receive information or to which the processor 110 might output information.

The network connectivity devices 120 may also be capable of transmitting or receiving data wirelessly in the form of electromagnetic waves, such as radio frequency signals or microwave frequency signals. Information transmitted or received by the network connectivity devices 120 may include data that has been processed by the processor 110 or instructions that are to be executed by processor 110. The data may be ordered according to different sequences as may be desirable for either processing or generating the data or transmitting or receiving the data.

In various embodiments, the RAM 130 may be used to store volatile data and instructions that are executed by the processor 110. The ROM 140 shown in FIG. 1 may be used to store instructions and perhaps data that are read during execution of the instructions. Access to both RAM 130 and ROM 140 is typically faster than to secondary storage 150. The secondary storage 150 is typically comprised of one or more disk drives or tape drives and may be used for non-volatile storage of data or as an over-flow data storage device if RAM 130 is not large enough to hold all working data. Secondary storage 150 may be used to store programs that are loaded into RAM 130 when such programs are selected for execution. The I/O devices 160 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, voice recognizers, card readers, paper tape readers, printers, video monitors, or other well-known input/output devices.

Figure 2:
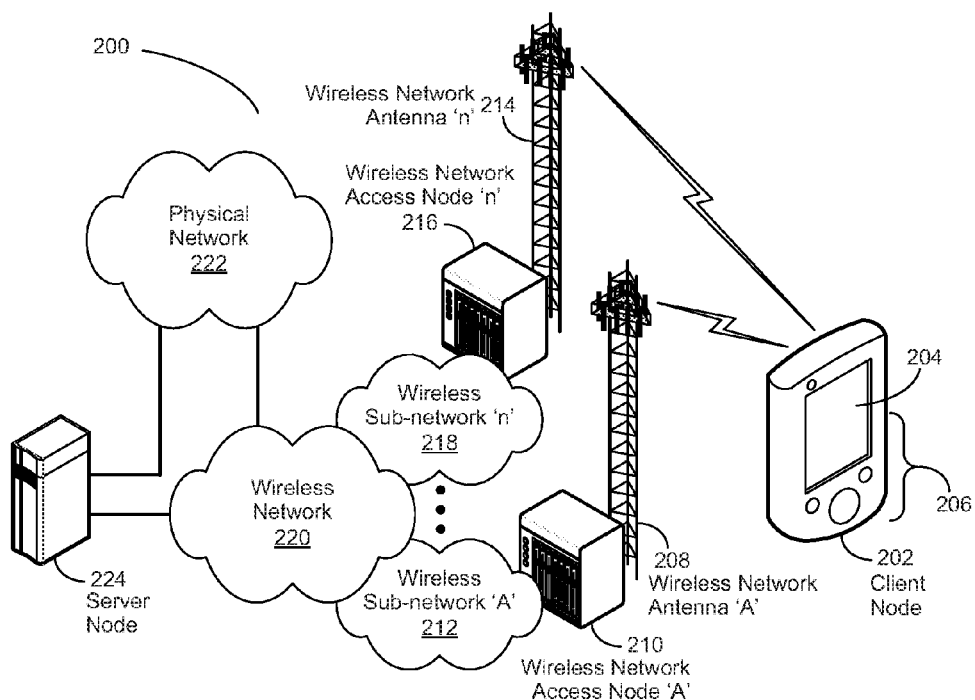
FIG. 2 shows a wireless communications system including an embodiment of a user equipment (UE) device.

FIG. 2 shows a wireless-enabled communications environment including an embodiment of a client node as implemented in an embodiment of the invention. Though illustrated as a mobile phone, the client node 202 may take various forms including a wireless handset, a pager, a smart phone, or a personal digital assistant (PDA). In various embodiments, the client node 202 may also comprise a portable computer, a tablet computer, a laptop computer, or any computing device operable to perform data communication operations. Many suitable devices combine some or all of these functions. In some embodiments, the client node 202 is not a general purpose computing device like a portable, laptop, or tablet computer, but rather is a special-purpose communications device such as a telecommunications device installed in a vehicle. The client node 202 may likewise be a device, include a device, or be included in a device that has similar capabilities but that is not transportable, such as a desktop computer, a set-top box, or a network node. In these and other embodiments, the client node 202 may support specialized activities such as gaming, inventory control, job control, task management functions, and so forth.

In various embodiments, the client node 202 includes a display 204. In these and other embodiments, the client node 202 may likewise include a touch-sensitive surface, a keyboard or other input keys 206 generally used for input by a user. The input keys 206 may likewise be a full or reduced alphanumeric keyboard such as QWERTY, Dvorak, AZERTY, and sequential keyboard types, or a traditional numeric keypad with alphabet letters associated with a telephone keypad. The input keys 206 may likewise include a trackwheel, an exit or escape key, a trackball, and other navigational or functional keys, which may be inwardly depressed to provide further input function. The client node 202 may likewise present options for the user to select, controls for the user to actuate, and cursors or other indicators for the user to direct.

The client node 202 may further accept data entry from the user, including numbers to dial or various parameter values for configuring the operation of the client node 202. The client node 202 may further execute one or more software or firmware applications in response to user commands. These applications may configure the client node 202 to perform various customized functions in response to user interaction. Additionally, the client node 202 may be programmed or configured over-the-air (OTA), for example from a wireless network access node 'A' 210 through 'n' 216 (e.g., a base station), a server node 224 (e.g., a host computer), or a peer client node 202.

Among the various applications executable by the client node 202 are a web browser, which enables the display 204 to display a web page. The web page may be obtained from a server node 224 through a wireless connection with a wireless network 220. The various applications may likewise be obtained from a peer client node 202 or other system over a connection to the wireless network 220 or any other wireless communication network or system. In various embodiments, the wireless network 220 comprises a plurality of wireless sub-networks (e.g., cells with corresponding coverage areas) 'A' 212 through 'n' 218. In these and other embodiments, the client node 202 transmits and receives communication signals, which are respectively communicated to and from the wireless network nodes 'A' 210 through 'n' 216 by wireless network antennas 'A' 208 through 'n' 214 (e.g., cell towers). In turn, the communication signals are used by the wireless network access nodes 'A' 210 through 'n' 216 to establish a wireless communication session with the client node 202. In turn, the wireless network access points 'A' 210 through 'n' 216 are respectively coupled to wireless sub-networks 'A' 212 through 'n' 218, which are connected to the wireless network 220.

In various embodiments, the wireless network 220 is coupled to a physical network 222, such as the Internet. Via the wireless network 220 and the physical network 222, the client node 202 has access to information on various hosts, such as the server node 224. In these and other embodiments, the server node 224 may provide content that may be shown on the display 204. Alternately, the client node 202 may access the wireless network 220 through a peer client node 202 acting as an intermediary, in a relay type or hop type of connection. Alternately, the client node 202 is tethered and obtains its data from a tethered device that is connected to the wireless network 212. Skilled practitioners of the art will recognize that many such embodiments are possible and the foregoing is not intended to limit the spirit, scope, or intention of the disclosure.

Figure 3:
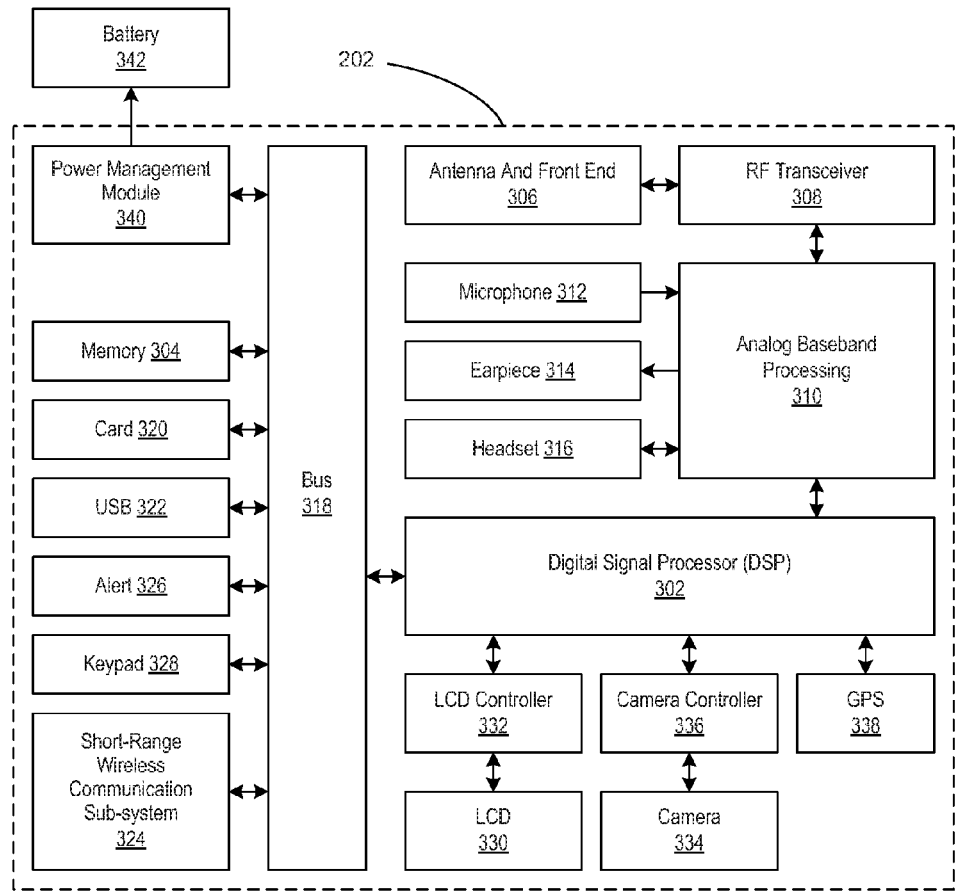
FIG. 3 is a simplified block diagram of an exemplary client node comprising a digital signal processor (DSP)

FIG. 3 depicts a block diagram of an exemplary client node as implemented with a digital signal processor (DSP) in accordance with an embodiment of the invention. While various components of a client node 202 are depicted, various embodiments of the client node 202 may include a subset of the listed components or additional components not listed. As shown in FIG. 3, the client node 202 includes a DSP 302 and a memory 304. As shown, the client node 202 may further include an antenna and front end unit 306, a radio frequency (RF) transceiver 308, an analog baseband processing unit 310, a microphone 312, an earpiece speaker 314, a headset port 316, a bus 318, such as a system bus or an input/output (I/O) interface bus, a removable memory card 320, a universal serial bus (USB) port 322, a short range wireless communication sub-system 324, an alert 326, a keypad 328, a liquid crystal display (LCD) 330, which may include a touch sensitive surface, an LCD controller 332, a charge-coupled device (CCD) camera 334, a camera controller 336, and a global positioning system (GPS) sensor 338, and a power management module 340 operably coupled to a power storage unit, such as a battery 342. In various embodiments, the client node 202 may include another kind of display that does not provide a touch sensitive screen. In one embodiment, the DSP 302 communicates directly with the memory 304 without passing through the input/output interface 318.

In various embodiments, the DSP 302 or some other form of controller or central processing unit (CPU) operates to control the various components of the client node 202 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the client node 202 to send and receive information from a cellular network or some other available wireless communications network or from a peer client node 202. In an embodiment, the antenna and front end unit 106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 306 may include antenna tuning or impedance matching components, RF power amplifiers, or low noise amplifiers.

In various embodiments, the RF transceiver 308 provides frequency shilling, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 or the DSP 302 or other central processing unit. In some embodiments, the RF Transceiver 108, portions of the Antenna and Front End 306, and the analog base band processing unit 310 may be combined in one or more processing units and/or application specific integrated circuits (ASICs).

The analog baseband processing unit 310 may provide various analog processing of inputs and outputs, for example analog processing of inputs from the microphone 312 and the headset 316 and outputs to the earpiece 314 and the headset 316. To that end, the analog baseband processing unit 310 may have ports for connecting to the built-in microphone 312 and the earpiece speaker 314 that enable the client node 202 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In various embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB interface 322 and the short range wireless communication sub-system 324. The USB interface 322 may be used to charge the client node 202 and may also enable the client node 202 to function as a peripheral device to exchange information with a personal computer or other computer system. The short range wireless communication sub-system 324 may include an infrared port, a Bluetooth interface, an IEEE 802.11 compliant wireless interface, or any other short range wireless communication sub-system, which may enable the client node 202 to communicate wirelessly with other nearby client nodes and access nodes.

The input/output interface 318 may further connect the DSP 302 to the alert 326 that, when triggered, causes the client node 202 to provide a notice to the user, for example, by ringing, playing a melody, or vibrating. The alert 326 may serve as a mechanism for alerting the user to any of various events such as an incoming call, a new text message, and an appointment reminder by silently vibrating, or by playing a specific pre-assigned melody for a particular caller.

The keypad 328 couples to the DSP 302 via the 110 interface 318 to provide one mechanism for the user to make selections, enter information, and otherwise provide input to the client node 202. The keyboard 328 may be a or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 330, which may include touch screen capability and also display text and/or graphics to the user. The LCD controller 332 couples the DSP 302 to the LCD 330.

The CCD camera 334, if equipped, enables the client node 202 to take digital pictures. The DSP 302 communicates with the CCD camera 334 via the camera controller 336. In another embodiment, a camera operating according to a technology other than Charge Coupled Device cameras may be employed. The GPS sensor 338 is coupled to the DSP 302 to decode global positioning system signals, thereby enabling the client node 202 to determine its position. Various other peripherals may also be included to provide additional functions, such as radio and television reception.

Figure 4:
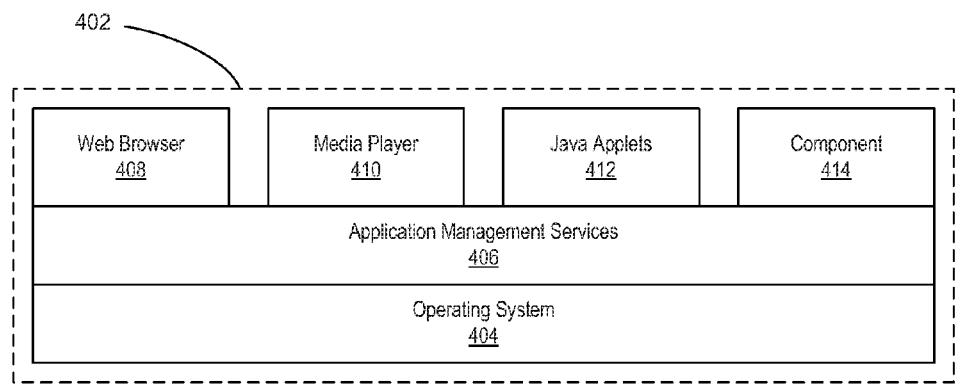
FIG. 4 is a simplified block diagram of a software environment that may be implemented by a DSP.

FIG. 4 illustrates a software environment 402 that may be implemented by a digital signal processor (DSP). In this embodiment, the DSP 302 shown in FIG. 3 executes an operating system 404, which provides a platform from which the rest of the software operates. The operating system 404 likewise provides the client node 202 hardware with standardized interfaces (e.g., drivers) that are accessible to application software. The operating system 404 likewise comprises application management services (AMS) 406 that transfer control between applications running on the client node 202. Also shown in FIG. 4 are a web browser application 408, a media player application 410, and Java applets 412. The web browser application 408 configures the client node 202 to operate as a web browser, allowing a user to enter information into forms and select links to retrieve and view web pages. The media player application 410 configures the client node 202 to retrieve and play audio or audiovisual media. The Java applets 412 configure the client node 202 to provide games, utilities, and other functionality. A component 414 may provide functionality described herein. In various embodiments, the client node 202, the wireless network nodes 'A' 210 through 'n' 216, and the server node 224 shown in FIG. 2 may likewise include a processing component that is capable of executing instructions related to the actions described above.

Figure 5:
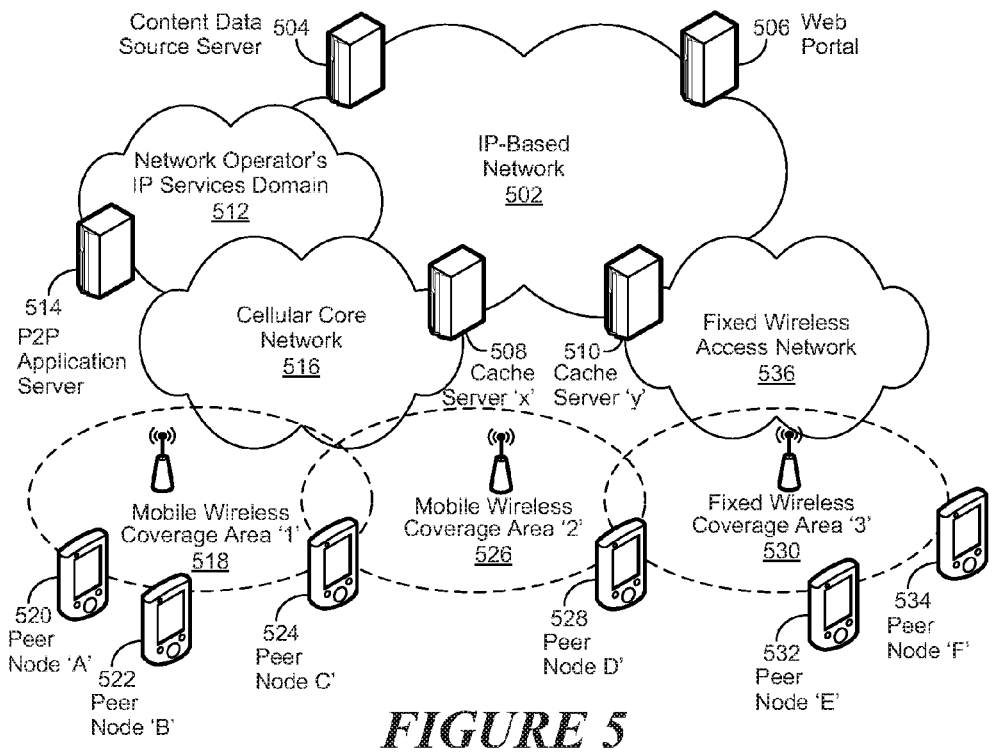
FIG. 5 is a simplified block diagram showing a peer-to-peer (P2P) application server (P2P AS) as implemented for P2P sharing of content data between client nodes in a wireless-enabled communications environment.

FIG. 5 is a simplified block diagram showing a peer-to-peer (P2P) application server (P2P AS) as implemented in accordance with an embodiment of the invention for P2P sharing of content data between peer nodes in a wireless-enabled communications environment. In this embodiment, an Internet Protocol (IP)-based network 502, such as the Internet, is connected to a mobile wireless network, such as a cellular core network 516, and a fixed wireless access network 536. As shown in FIG. 5, a network operator's IP services domain 512, which comprises a P2P AS 514 implemented as a server node with the cellular core network 516 and the IP-based network 502 to enable P2P content data sharing between peer nodes as described in greater detail herein. The IP-based network 502 comprises a content data source server 504, a web portal 506 and cache servers 'x' 508 and 'y' 510, respectively implemented at the connection points of the IP-based network 502 to the cellular core network 516 and the fixed broadband access network 436.

As likewise shown in FIG. 5, the cellular core network 516 comprises mobile wireless coverage areas '1' 518 and '2' 526 and the fixed broadband wireless access network 536 comprises a wireless coverage area '3' 530. Likewise, the mobile wireless coverage areas '1' 518 and '2' 526 overlap each other and the mobile wireless coverage area '2' 526 overlaps the fixed wireless coverage area '3' 530. In this embodiment, connectivity to the cellular core network 516 is achieved by peer nodes 'A' 520 and 'B' 522 when they are within the mobile wireless coverage area '1' 518 and by peer node 'D' when it is within the mobile wireless coverage area '2' 526. However, peer node 'C' 524 is able to connect to the cellular core network 516 when it is within either the mobile wireless coverage areas '1' 518 or '2' 526. Likewise, connectivity to the fixed broadband wireless access network 536 is achieved by peer nodes 'D' 528, 'E' 532 and 'F' 534 when they are within the fixed wireless coverage area '3' 530. However, peer node 'D' 528 is able to connect to both the cellular core network 516 and to the fixed broadband wireless access network 536 when it is within the overlapping coverage areas of the mobile wireless coverage area '2' 526 and the fixed wireless coverage area '3' 530.

In various embodiments, the individual peer nodes 'A' 520, 'B' 522, 'C' 524, 'D' 528, 'E' 532, and 'F' 534 are implemented to perform peer-to-peer (P2P) content data sharing operations. In these and other embodiments, the P2P content data sharing operations include sharing uplink bandwidth and storage space with each other while downloading data from the content data source server 504. As such, the P2P content data sharing operations performed by the peer nodes 'A' 520, 'B' 522, 'C' 524, 'D' 528, 'E' 532, and 'F' 534 can spread traffic across the edge of the cellular core network 516. As a result of the performance of these P2P content data sharing operations, the Internet transit cost is reduced as well as the storage and bandwidth demands of centralized servers, such as the content data source server 504 and the web portal 506. Likewise, localized P2P content data sharing operations performed by the peer nodes 'A' 520, 'B' 522, 'C' 524, 'D' 528, 'E' 532, and 'F' 534 may likewise improve the user experience due to improved data throughput.

In this embodiment, peer node 'D' 528 can establish connectivity with either the cellular core network 516 or the fixed wireless access network 530 to access the web portal 506. Once accessed, the user performs search operations at the web portal 506 to locate desired content data, which once located, is requested from the content data source server 504. In various embodiments, the content data request may be redirected to the cache server 'x' 508 or 'y' 510, if available, which may be topologically closer to the peer node 'D' 528. The desired content data is then downloaded from the content data source server 504, or alternatively, from the cache server 'x' 508 or 'y' 510 if available and topologically closer to the peer node 'D' 528.

With the P2P content data sharing operations described in greater detail herein, the peer node 'D' 528 can share its downloaded contents to the other peer nodes 'A' 520, 'B' 522, 'C' 524, 'E' 532, and 'F' 534. As a result, each of the other peer nodes 'A' 520, 'B' 522, 'C' 524, 'E' 532, and 'F' 534 has the potential to become a source for the downloaded content data. Likewise, each of the peer nodes 'A' 520, 'B' 522, 'C' 524, 'D' 528, 'E' 532, and 'F' 534 may individually work in either client or server peer mode in when sharing content data in P2P mode. When in the client mode, an individual peer node 'A' 520, 'B' 522, 'C' 524, 'D' 528, 'E' 532, or 'F' 534 only retrieves content data from the content data source server 504 or other individual peer nodes 'A' 520, 'B' 522, 'C' 524, 'D' 528, 'E' 532, or 'F' 534. When in the server mode, an individual peer node 'A' 520, 'B' 522, 'C' 524, 'D' 528, 'E' 532, or 'F' 534 shares the downloaded content data with the other peer nodes 'A' 520, 'B' 522, 'C' 524, 'D' 528, 'E' 532, or 'F' 534. Likewise, in various embodiments, a plurality of P2P application servers (e.g., P2P AS 514) deployed in the P2P AS network 512 manage the sharing of P2P content data among the various peer nodes 'A' 520, 'B' 522, 'C' 524, 'D' 528, 'E' 532, and 'F' 534. In one embodiment, the P2P application server 514 implemented in the network operator's IP services domain 512 manages the P2P content data sharing by maintaining a candidate list of the individual peer node 'A' 520, 'B' 522, 'C' 524, 'D' 528, 'E' 532, and 'F' 534 that are capable of providing the requested content data.

Figure 6:
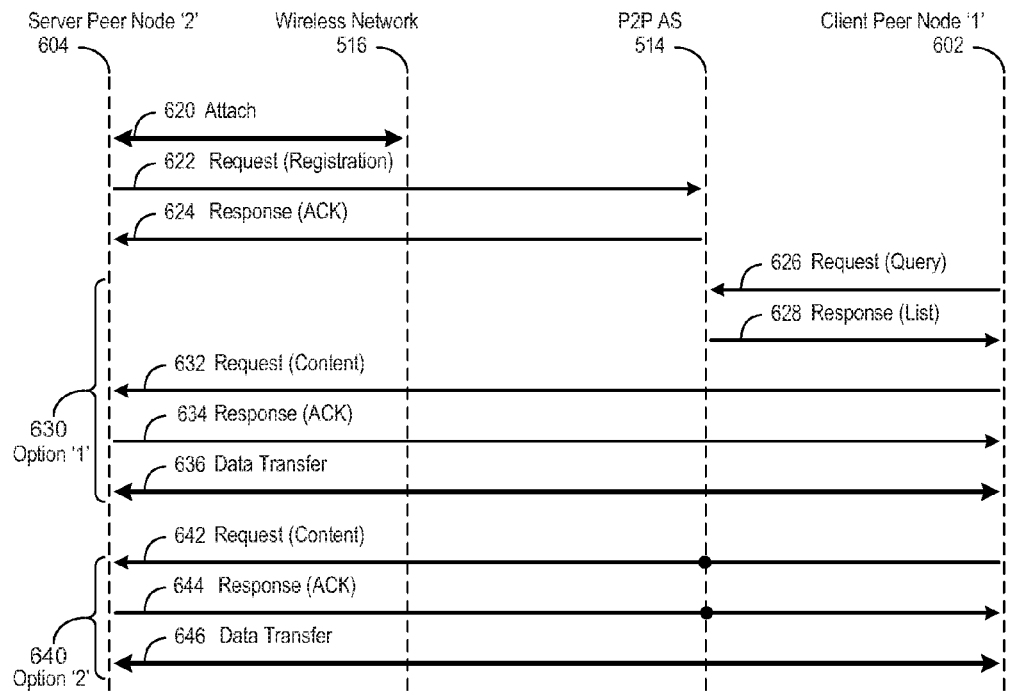
FIG. 6 shows a process signal flow as implemented to perform P2P content data sharing operations between client nodes.

FIG. 6 shows a process signal flow as implemented in accordance with an embodiment of the invention to perform peer-to-peer (P2P) content data sharing operations between user equipment (UE) devices. In this embodiment, content data is exchanged between a client peer node '1' 602 and a server peer node '2' 604 connected to a wireless network 516, which in turn provides access to a P2P application server (P2P AS) 514.

In various embodiments, the client peer node '1' 602 and the server peer node '2' are registered with the P2P AS 514 signifying their ability to participate in the P2P content data sharing operations. In these and other embodiments, the registration of the client peer node '1' 602 and the server peer node '2' 604 likewise indicate the client peer node's '1' 602 and the server peer node's '2' 604 preferred peer mode of operation through application-layer signaling. In these various embodiments, the application-layer signaling may be either IP multimedia subsystem (IMS), such as session initiating protocol (SIP) signaling, or non-IMS signaling, such as Blackberry® (BB) signaling. Accordingly, a peer node's peer mode preference indication will be considered in these various embodiments by the P2P AS 514 to determine which candidate peer nodes can operate as a content data source when participating in P2P content data sharing operations.

In various embodiments, a P2P content data sharing protocol is implemented that comprises a client mode as the default peer mode for various peer nodes, such as the client peer node '1' 602. However, a peer node does not need to indicate its peer mode preference in these various embodiments unless the peer node requests to be configured as the server peer node, such as in the case with server peer node '2' 604. When this is the case, the peer node (e.g., server peer node '2' 604) indicates its server mode preference to the P2P AS 514. In turn, the P2P AS 514 lists the peer node on a server peer node list. Likewise, the P2P AS 514 does not place a peer node configured as a client peer node (e.g., client peer client node '1' 602) on the server peer node list. Those of skill in the art will recognize that this approach provides the benefit of providing backwards compatibility as older peer nodes that are not capable of providing server peer node capabilities will still be compatible with the P2P content data sharing operations described in greater detail herein.

In one embodiment, the P2P AS 514 maintains a server peer node list that contains all peer nodes that have indicated server mode as their preferred peer mode. In this embodiment, the server peer node list is sorted based on the preference priority that the P2P AS 514 has assigned to each server peer node. When the server peer node list is received by a client peer node, it selects a target server peer node according to its associated preference priority, which is sorted from highest to lowest in the server peer node list. Alternatively, the client peer node may not select a target server peer node based on its associated preference priorities.

In another embodiment, the server peer node list contains some of the peer nodes that have indicated server mode as their preferred peer mode. In this embodiment, some peer nodes have been filtered out by the P2P AS 514 based on predetermined P2P content data sharing operation policies. The server peer node list may be sorted based on the preference priority that the P2P AS 514 has assigned to each server peer node. If the list is sorted, the client peer node may select a target server peer node according to its preference priority, which is sorted from highest to the lowest. Alternatively, the client peer node may not select a target server peer node based on its associated preference priorities. Skilled practitioners of the art will appreciate that this approach provides more control to the P2P AS 514 regarding how P2P content data sharing operations are performed among peer nodes.

In one embodiment, a peer node may be optionally notified by the P2P AS 514 whether or not it is set as server mode in the server peer node list. In this embodiment, the notification is embedded in an acknowledgement (ACK) message sent to the associated peer node when the peer mode preference indication is received by the P2P AS 514. However, the peer node is still ready to serve other peer nodes once it has sent its server mode preference indication, even it does not receive the mode setting notification from the P2P AS 514. In another embodiment, a peer node may change the peer triode preference by sending a new indication to the P2P AS 514. As an example, a peer node may prefer to operate as a client instead of a server when its battery level is below certain threshold.

In yet another embodiment, a timer is associated with each peer mode preference indication. In this embodiment, the P2P AS 514 resets a peer node's peer mode preference to client mode if it does not hear from the associated peer node after the timer expires. Those of skill in the art will appreciate that the timer removes the need for additional signaling between a peer node and the P2P AS 514 once a peer node ceases to operate in a server peer mode. However, a peer node can continue to operate in server peer mode by resending its server mode preference indication to the P2P AS 514 after the timer expires.

Referring now to FIG. 6, the server peer node '2' 604 connects to the wireless network in step 620 to enable P2P content data sharing operations between the server peer node '2' 604 and the client peer node '1' 602. The server peer node '2' 604 then sends a registration request 622 to the P2P AS 514. As described in greater detail herein, the registration request 622 indicates the peer mode preference of the server peer node '2' 604, and its associated timer value, to the P2P AS 514. The registration request 622 likewise announces the available content data chunks that the server peer node '2' 604 is willing to share. Alternatively, if the server peer node '2' only wants to act as a client, it does not need to register until it requests its desired content data from the P2P AS 514. Thereafter, the P2P AS 514 responds with an ACK response 624, which confirms the peer mode setting for the server peer node '2' 604. In some embodiments, as described in greater detail herein, the ACK response 624 is optional. In some embodiments, the ACK response message 624 may also contain predetermined content data sharing operation policies.

In a first embodiment, shown as option '1' 630 in FIG. 6, the client peer node '1' sends a request 626 to the P2P AS 514 to query the availability of content data for retrieval. In response, the P2P AS 514 responds with a response 628 containing a list of server peer nodes (e.g., server peer node '2' 604) and associated information, such as their respective addresses. After receiving the address information for the server peer node '2' 604, the client peer node '1' 602 then sends a request 632 directly to the server peer node '2' 604 for the desired content data without going through the P2P AS 514. In response, the server peer node '2' 604 responds directly to the client peer node '1' 602 with an ACK response 634 without going through the P2P AS 514. The requested content data is then transferred 636 from the server peer node '2' 604 to the client peer node '1' 602.

In a second embodiment, shown as option '2' 640 in FIG. 6, the client peer node '1' 602 then sends a request 642 for the desired content data to the P2P AS 514, where it is then sent to the server peer node '2' 604. In response, the server peer node '2' 604 responds with an ACK response 644 to the P2P AS 514, where it is then sent to the client peer node '1' 602. The requested content data is then transferred 646 from the server peer node '2' 604 to the client peer node '1' 602.

Those of skill in the art will recognize that the first embodiment, shown as option '1' 630 in FIG. 6, reduces the signaling processing load at the P2P AS 514 as well as the signaling latency between the server peer node '2' 604 and the client peer node '1' 602, it will also be appreciated that option '2' 640 likewise assists in network address translation (NAT) if either the server peer node '2' 604 or the client peer node '1' 602 or both are located in private networks behind NAT-enabled firewalls. In contrast, the second embodiment, shown as option '2' 640 in FIG. 6, provides more control o the P2P AS 514 by allowing it to perform authorization and authentication operations on content data requests between the client peer node '1' 602 and the server peer node '2' 604.

In some embodiments, the content data request 632, 642 and ACK responses 634, 644 may not be defined by the P2P content data sharing protocol described in greater detail herein. Instead, they may be carried by a standard application layer protocol such as HTTP or SIP. In other embodiments, the server peer node '2' 604 can only operate as a server peer node during P2P content data sharing operations when the registration request 622 is received by the P2P AS 514. In these and other embodiments, the server peer node '2' 604 cannot operate as a server peer node if the registration request from the server peer node '2' 604 is lost before it is received by the P2P AS 514.

Figure 7:
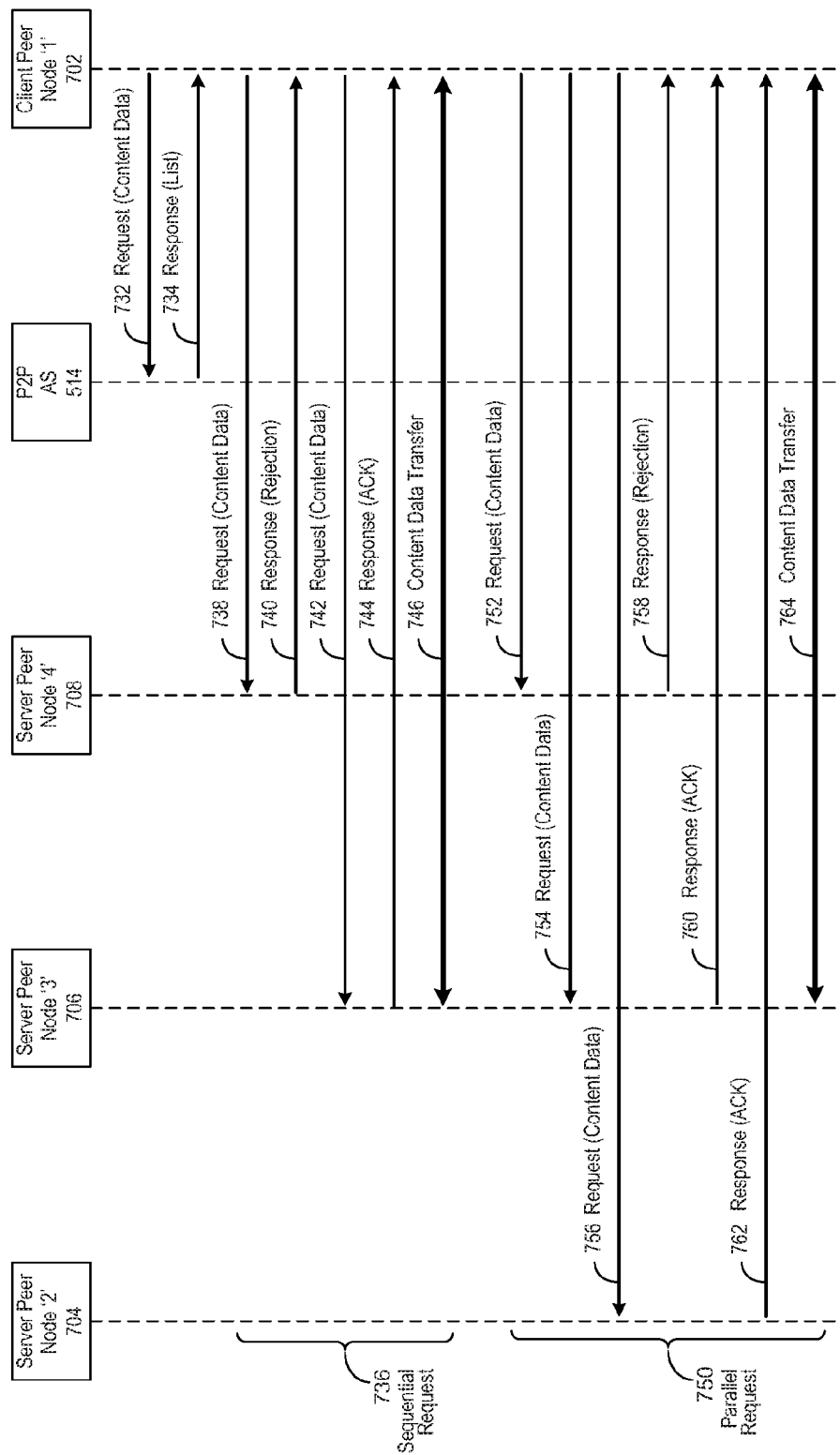
FIG. 7 shows sequential and parallel request process signal flows as implemented to perform P2P content data sharing operations between a plurality of server peer nodes and a client peer node.

FIG. 7 shows sequential and parallel request process signal flows as implemented in accordance with embodiments of the invention to perform peer-to-peer (P2P) content data sharing operations between a plurality of server peer nodes and a client peer node. In these embodiments, content data is variously exchanged between a client peer node '1' 702 and server peer nodes '2' 704, '3' 706, and '4' 708 in conjunction with a P2P application server (P2P AS) 512. To initiate P2P content data sharing operations, the client peer node '1' 702 first sends a content data request 732 to the P2P AS 514. The P2P AS 514 then responds to the client peer node '1' 702 with a response 734 containing a list of server peer nodes (e.g., server peer node '2' 704, '3' 706, and '4' 708) and associated information, such as their respective addresses.

In one embodiment, the client peer node '1' uses the list of server peer nodes and their associated address information to sequentially request 736 content data from server peer nodes '4' 708, '3' 706 and '2' 704. As shown in FIG. 7, the client peer node '1' 702 first sends a content data request 738 to the server peer node '4' 708, but receives a rejection response 740 in return. As a result, the client peer node '1' 702 then sends a content data request 742 to the server peer node '3' 706 and receives an ACK response 744 in return. Accordingly, a data transfer 746 is then performed between the server peer node '3' 706 and the client peer node '1' 702. As a result, the client peer node '1' 702 does not need to send a content data request to the server peer node '2' 704.

In another embodiment, the client peer node '1' uses the list of server peer nodes and their associated address information to request content data in parallel 750 from server peer nodes '4' 708, '3' 706 and '2' 704. As shown in FIG. 7, the client peer node '1' 702 concurrently sends content data requests 752, 754 and 756 respectively to the server peers UE '4' 708, '3' 706, and '2' 704. In response, the client peer node '1' 702 receives a rejection request 758 from the server peer node '4' 708 and ACK responses 760 and 762 respectively from the server peer nodes '3' 706 and '2' 702. The client peer node '1' 702 then selects the server peer node '3' 706 to perform the data transfer 764. As a result, the server peer node '2' 704 does not need to transfer the requested data content data to the client peer node '1' 702.

Figure 8:
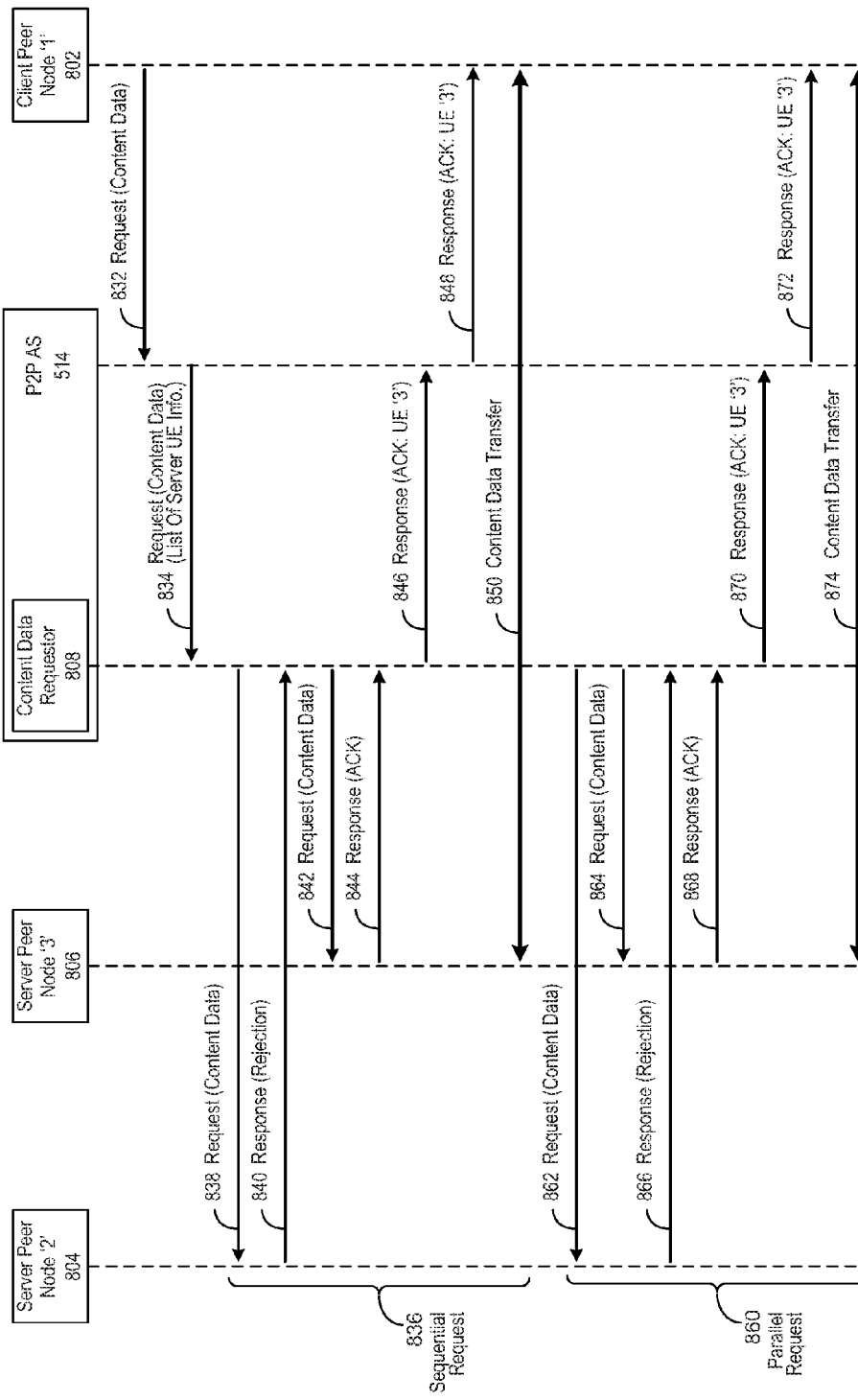
FIG. 8 shows sequential and parallel request process signal flows as implemented with a content data requestor to perform P2P content data sharing operations between a plurality of server peer nodes and a client peer node.

FIG. 8 shows sequential and parallel request process signal flows as implemented with a content data requestor in accordance with embodiments of the invention to perform peer-to-peer (P2P) content data sharing operations between a plurality of server peer nodes and a client peer node. In these embodiments, content data is variously exchanged between a client peer node '1' 802 and server peer nodes '2' 804 and '3' 806 in conjunction with a P2P application server (P2P AS) 512.

In these and other embodiments, the P2P AS 514 comprises a content data requestor entity 808, which is responsible for issuing content data requests according to a predetermined algorithm (e.g., sequential, parallel, etc.). In various embodiments, the content data requestor entity 808 may reside either at the P2P AS 514 or the client peer node '1' 802. It will be appreciated by those of skill in the art that the implementation of the content data requestor entity 808 in the P2P AS 514 provides the benefit of offloading signaling responsibility from the client peer node '1' 802, which may have limited processing capabilities and battery power. As such, the client peer node '1' 802 only needs to send a single one content data request even though multiple server peer nodes (e.g., server peer nodes '2' 804 and '3' 806) may need to be contacted. To initiate P2P content data sharing operations, the client peer node '1' 802 first sends a content request 832 to the P2P AS 514. The P2P AS 514 then forwards the content request 834, along with a list of server peer nodes '2' 804 and '3' 806 and their associated information, such as their respective addresses.

In one embodiment, the content data requestor entity 808 uses the list of server peer nodes and their associated address information to request 736 content data sequentially from server peer nodes '2' 804 and '3' 806. As shown in FIG. 8, the content data requestor entity 808 first sends a content data request 738 to the server peer node '2' 804, but receives a rejection response 840 in return. As a result, the content data requestor entity 808 then sends a content data request 842 to the server peer node '3' 806 and receives an ACK response 844 in return, in turn, the content data requestor entity 808 forwards the ACK response 846 to the P2P AS 514, which then forwards the ACK response 848 to the client peer node '1' 802. Accordingly, a data transfer 850 is then performed between the server peer node '3' 806 and the client peer node '1' 802.

In another embodiment, the content data requestor entity 808 uses the list of server peer nodes and their associated address information to request content data in parallel 750 from server peer nodes '2' 804 and '3' 706. As shown in FIG. 8, the content data requestor entity 808 concurrently sends content data requests 862 and 864 respectively to the server peers UE '2' 804 and '3' 806. In response, the content data requestor entity 808 receives a rejection request 866 from the server peer node '2' 804 and an ACK response 868 respectively from the server peer nodes '2' 804 and '3' 806. In turn, the content data requestor entity 808 forwards the ACK response 870 to the P2P AS 514, which then forwards the ACK response 872 to the client peer node '1' 802. Accordingly, a data transfer 874 is then performed between the server peer node '3' 806 and the client peer node '1' 802.

Figure 9:
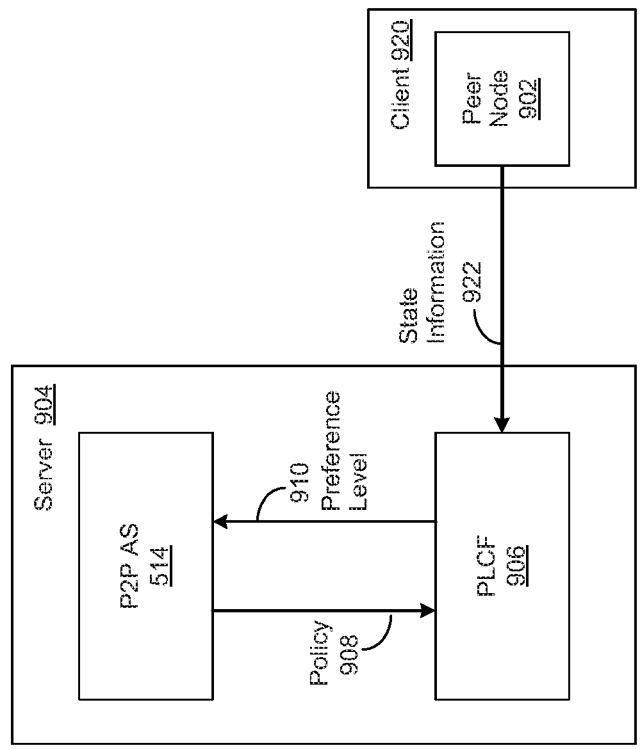
FIG. 9 is a simplified block diagram of a server-side implementation of a preference level conversion function (PLCF) module and a P2P AS to improve the efficiency of network operations.

FIG. 9 is a simplified block diagram of a server-side implementation of a preference level conversion function (PLCF) module and a peer-to-peer (P2P) application server (P2P AS) in accordance with an embodiment of the invention to improve the efficiency of network operations. In various embodiments, a peer node may upload content data received from other peer nodes when configured by the P2P AS to operate as a server peer node. In these and other embodiments, the P2P AS configures the peer mode of the peer node according to various cellular network states. Accordingly, network operation efficiency is improved by reducing content data delivery cost and minimizing the quality of service (QoS) impact on other data services. As an example, peer nodes located in a heavily loaded cell are not preferred to operate as a server peer node as doing so will worsen the cell's load condition. As another example, contention in WiFi access network is less of a concern than it is in a cellular network. Therefore, a peer node implemented with resources for WiFi access may be preferred to operate as a server peer node over those implemented solely with resources for cellular access.

In these various embodiments, the cellular states may include cellular network states, such as cell load, as well as individual peer node's cellular states such as radio access type and subscription type. In one embodiment, the cellular state is static and comprises the peer node's subscription type (e.g., flat-rate data plan or charge based on data usage). In another embodiment, the cellular state is slow changing (e.g., changing every tens of minutes) and comprises the peer node's radio access type (e.g., cellular or WiFi), battery level, and user's input. In yet another embodiment, the cellular state is fast changing (e.g., changing every tens of milliseconds) and comprises the peer node's radio link quality and cell load condition.

In various embodiments, the static and slow changing cellular states are used to determine if a peer node is suitable to operate as a server peer node. In these and other embodiments, state information associated with these cellular states is conveyed to the P2P AS through application layer signaling. In some embodiments, it may be advantageous to make the P2P AS access-agnostic as it may not need to know exact state information such as radio access type. In these various embodiments, a PLCF module is implemented to translate received cellular state information to a binary indication, such as preferred or non-preferred. In turn, the binary indication is used by the P2P AS to determine the peer mode of the peer node. Skilled practitioners of the art recognize that this approach decouples the P2P AS from the various underlying cellular state information. As a result, associated policies for preference level conversion can be pre-configured or dynamically provisioned at PLCF by a network operator. In various embodiments, the binary indication is extended with additional bits (e.g., two indication bits for four levels of preference) to indicate additional levels of preference with more bits.

Referring now to FIG. 9, a PCLF module 906 is implemented with a P2P AS 514 in a server 902. In this embodiment, the PCLF module 906 receives policy information 908 from the P2P AS 514 and cellular state information 922 from a peer node 902 operating as a client 920. The policy information 908 and the cellular state information 922 are then processed by the PLCF module 906 to generate a preference level 910, which is then provided to the P2P AS 514. In turn, the P2P AS 514 uses the preference level to determine whether or not the peer node 902 should operate in a server peer mode.

In one embodiment, the PLCF module is implemented as a network node, separate from the server 902. In various embodiments, the peer node 902 may not provide cellular state information 922 to the PLCF module 906. As an example, if the peer node 902 changes its radio access type from Wifi to cellular, a cellular state information update does not need to be sent to the PLCF module 906. As a result, its server peer mode may not be changed by the P2P AS even though the peer mode of the peer node 902 should have been set to client peer mode when its current radio access type was changed.

Accordingly, the peer node 902 may receive content data requests from other peer nodes. As a result, the peer node 902 can reject the first content data request it receives and the rejection message will be intercepted by the PLCF module 906. The rejection message may contain the cause of rejection (e.g., radio access type change), which will also serve as the state update to the PLCF module 906. Accordingly, it will be apparent to those of skill in the art that the P2P AS 514 will eventually change the peer mode configuration of the peer node 902 to be a client peer based on the preference level input 910 from the PLCF module 906. It will likewise be apparent that the benefit of the described implicit cellular state update approach is to reduce the signaling cost for the peer node 902.

Figure 10:
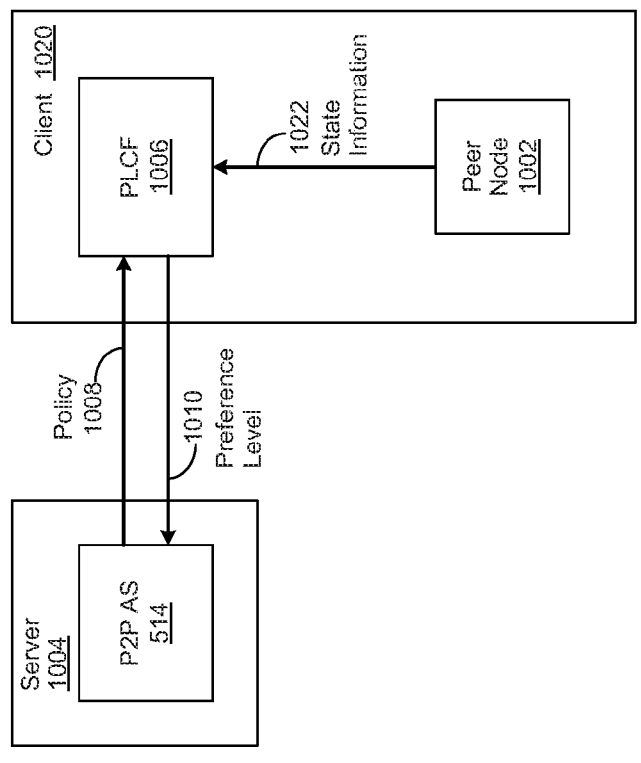
FIG. 10 is a simplified block diagram of a client-side implementation of a PLCF module and a peer node to improve the efficiency of network operations.

FIG. 10 is a simplified block diagram of a client-side implementation of a preference level conversion function (PLCF) module and a peer mode in accordance with an embodiment of the invention to improve the efficiency of network operations. In this embodiment, a P2P AS 514 is implemented in a server 1002 and a PCLF module 1006 is implemented with a peer node 1002 in a client 1020. The PLCF module 1006 receives policy information 1008 from the P2P AS 514 and cellular state information 1022 from the peer node 1002. The policy information 1008 and the cellular state information 1022 are then processed by the PLCF module 1006 to generate a preference level 9100, which is then provided to the P2P AS 514. In turn, the P2P AS 514 uses the preference level to determine whether or not the peer node 1002 should operate in a server peer mode.

Figure 11:
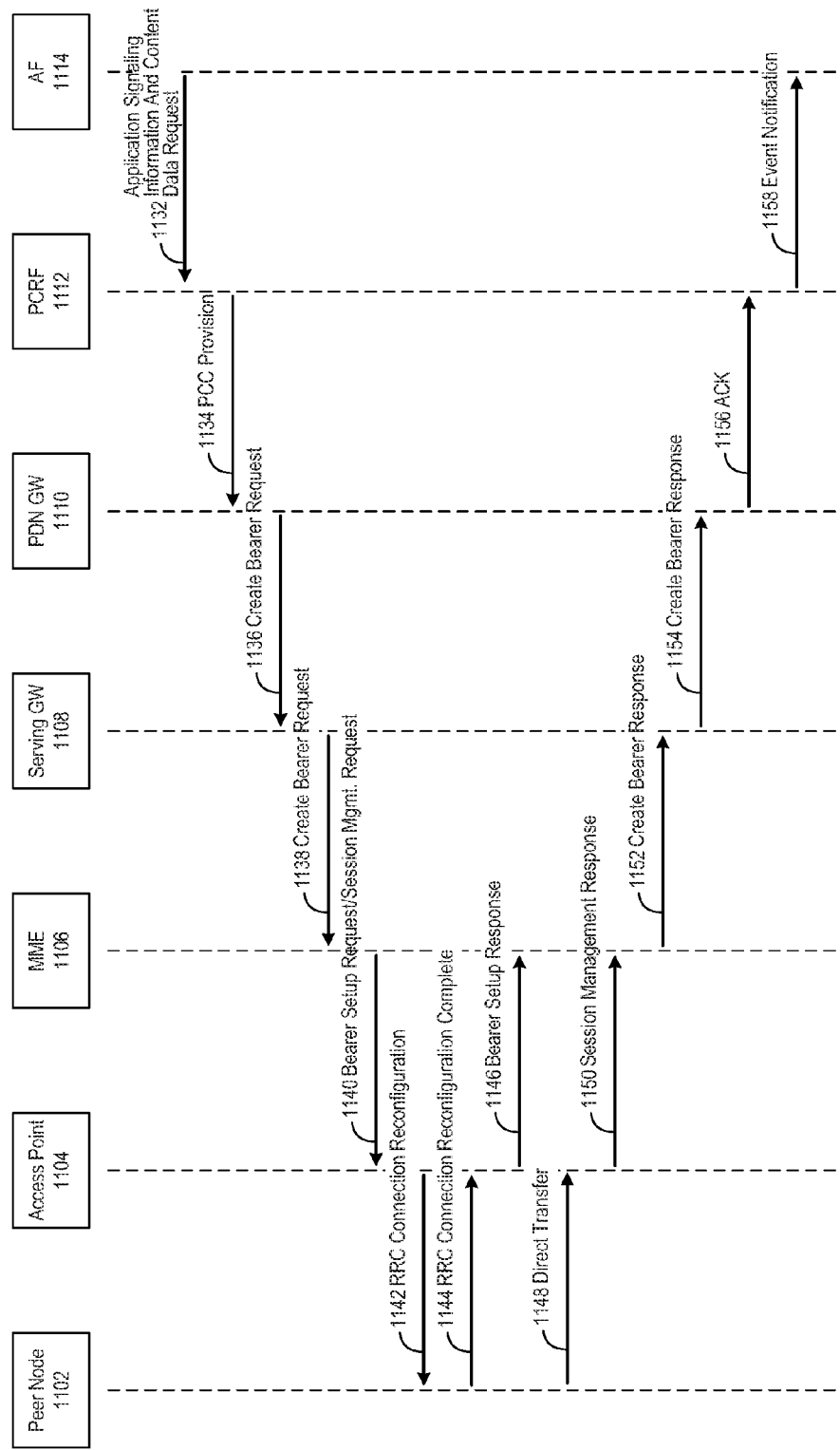
FIG. 11 shows signal flows as implemented with an application function (AF) to more efficiently P2P content data sharing operations.

FIG. 11 shows signal flows as implemented with an application function (AF) in accordance with embodiments of the invention to more efficiently perform peer-to-peer (P2P) content data sharing operations. The fast changing cellular states described in greater detail herein have no affect on the peer mode assigned to a peer node by a P2P application server (P2P AS). Instead, they are used to determine whether or not it is efficient to establish content data sharing connections between various peer nodes. However, skilled practitioners of the art will appreciate that it is not efficient to use application layer signaling for the provision of fast changing cellular state information.

In one embodiment, a determination is made by server peer node whether to accept or reject a content data request based on a current fast changing cellular state, such as the quality of its current radio link. As an example, if the quality of the radio link is poor, the server peer node simply rejects the content data sharing request. In this and other embodiments, the corresponding response message may contain the cause of rejection (e.g., poor radio link quality). If the content data request is rejected, its corresponding response message will be intercepted by the Preference Level Conversion Function (PLCF) module described in greater detail herein. Since the rejection is based on fast changing cellular states, the server peer node's preference level will not be affected. To further the example, the server peer node may not respond to the content data request if it does not want to share the content data at a particular moment due to current poor radio conditions. It is even possible that the server peer node may be out of a radio coverage area when the content data request is received. Likewise, the server peer node may not recognize the content data request at all, in which case it will not issue a response. If there is no response from the server peer node, then its preference level, as well as its peer mode will not be affected, same as in the case of a content data request rejection.

In another embodiment, subsets of the fast changing cellular state information may not be applicable for the previously-described embodiment. For example, the peer node may not have the state information associated with the overall load conditions of the current cell. Instead a network-based approach is implemented in this embodiment, where fast changing cellular states at the system level (e.g., cell load condition) are evaluated to determine if it is efficient to initiate a content data sharing connection with a server peer node. Likewise, an incoming content data request may be delayed or blocked if the cell where the server peer node is located is overloaded. In this embodiment, this situation is addressed by implementing a conditional bearer establishment request message such that the corresponding cellular network can determine whether to establish a bearer based on the current network conditions such as cell load. As shown in FIG. 11, an application-layer content data request is translated to a lower layer conditional bearer establishment request.

Referring now to FIG. 11, an application function (AF) 1114 implemented in a cellular network operator's service domain intercepts the application signaling information 1132 originating from a P2P AS and destined for a target server peer node 1102. Concurrently, the P2P AS intercepts the corresponding incoming content data request 1132 from a client peer node that is likewise destined to the server peer node 1102.

The AF 1114 then provides 1134 the related service information to a policy charging rules function (PCRF) 1112. In turn, the PCRF 1110 generates a Policy Control and Charging (PCC) provision message 1134 to the Packet Data Network Gateway (PDN GW) 1110, which translates the received application signaling information and content data request into a conditional bearer establishment request 1136. The conditional bearer request 1136 is then provided to a serving gateway (GW) 1108, which in turn generates its own conditional bearer establishment request 1138, which is provided to the Mobility Management Entity (MME) 1106. In turn, the MME 1106 then generates a bearer setup request/session management request 1140, which is provided to an access point (e.g., an eNodeB) 1104, which generates a Radio Resource Control (RRC) connection reconfiguration message 1142, which is received by the server peer node 1102. In this embodiment, the access point 1104 (e.g., eNodeB) determines whether or not to establish the conditional bearer based on the cell load condition after it receives the conditional bearer establishment request 1140. This approach requires changes to the current Evolved Packet System (EPS) specification.

In response, the server peer node 1102 generates a response 1444 signifying that the RCC connection reconfiguration has been completed. Once generated the response is provided to the access point 1104, which in turn provides a bearer setup response 1146 to the MME 1106. The server peer node 1102 likewise sends a direct transfer 1148 message to the access point 1104, which in turn sends a session management response 1150 to the MME 1106. The MME 1106 then sends a create bearer response 1152 message to the serving GW 1108, where the create bearer response 1154 message is then forwarded to the PDD GW 1110. The PDN GW 1110 then provides an ACK response 1156 to the PCRF 1112, which in turn provides an event notification 1158 to the AF 1114.

In another embodiment, the PCRF 1112 translates received service information to a quality of service (QoS) policy. In this embodiment, the QoS policy is defined such that the Allocation and Retention Priority (ARP) associated with the requested bearer is set to the lowest level. Therefore, the bearer request may he rejected by the access point (e.g., eNodeB) if the cell is overloaded. This approach may require some clarification to the current EPS specification on how to interpret the ARP setting for conditional bearer establishment purpose. Those of skill in the art will recognize that it is also possible to propose a new ARP definition to explicitly indicate whether the bearer establishment is conditional or not.

From the foregoing, it will be apparent that multiple copies of the same content data may exist and some copies may reside on hosts for which there is a fast fluctuating cost to retrieve the content data. Mobile devices and the fluctuating conditions of their radio resources is a primary example, but not necessarily the only case. It is likewise apparent that it is advantageous to retrieve the desired content data from the host which has lowest retrieval cost. However, by the time the retrieval request reaches the host that is deemed representing the lowest cost, its cost may have changed, and that host is no longer the best choice. It will likewise be apparent that the implementation of a conditional retrieval request (e.g., "retrieve only if cost is acceptable," or "below some level," etc) allows the content data to be optimally retrieved when there is no prior knowledge of its associated retrieval cost.

Figure 12:
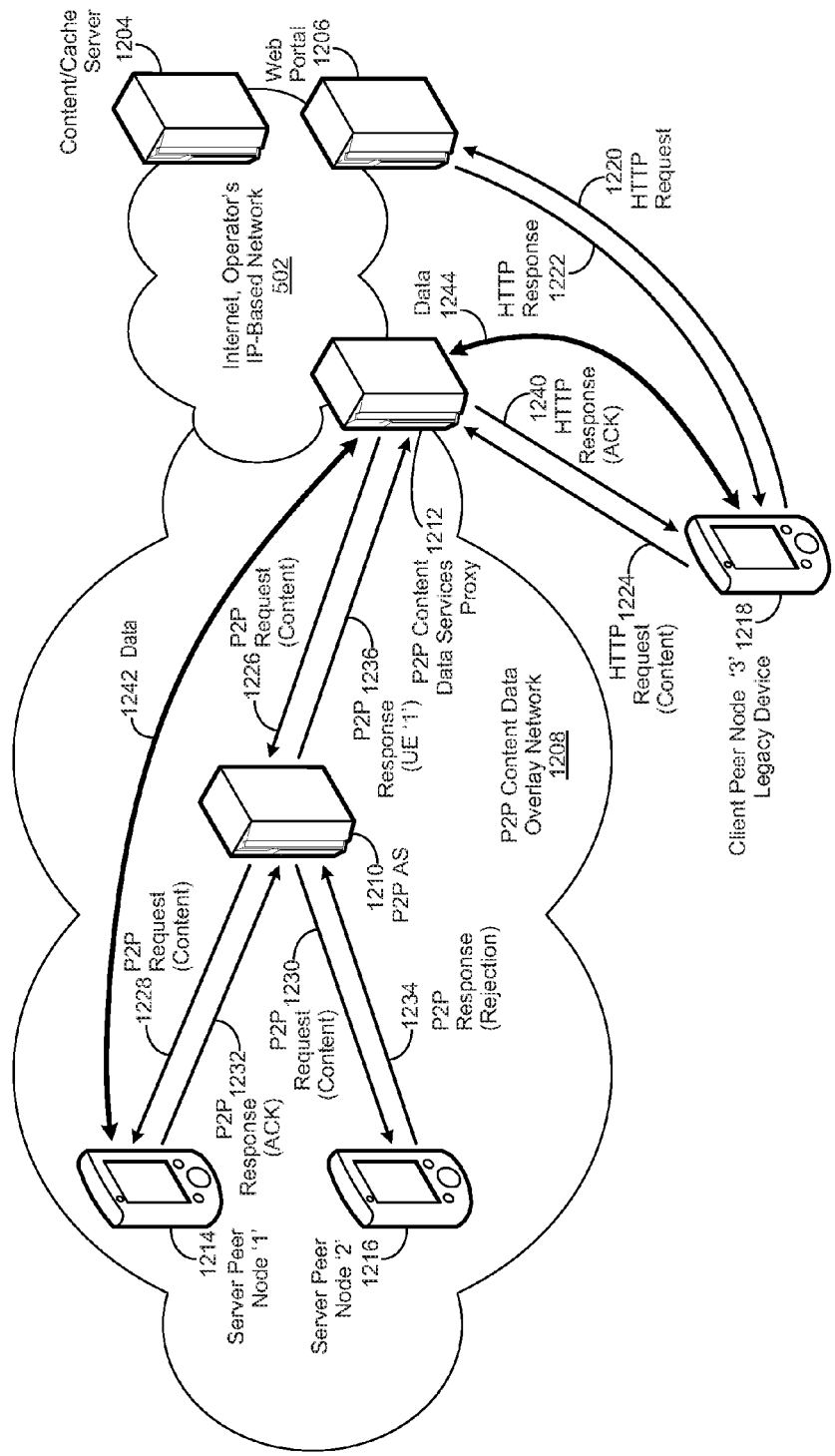
FIG. 12 is a simplified block diagram of a P2P AS to enable P2P content data sharing with a legacy peer node.

FIG. 12 is a simplified block diagram of a peer-to-peer (P2P) application server (P2P AS) as implemented in accordance with an embodiment of the invention to enable P2P content data sharing with a legacy user equipment (UE) device. In various embodiments, a peer node requires the implementation of a P2P content data sharing protocol stack, as described in greater detail herein, to perform P2P content data sharing operations, particularly if it operates as a server peer node. However, in other embodiments, many of the UE devices in current operation may not be capable of using the P2P content data sharing protocol.

Nonetheless, legacy peer nodes that are currently able to receive content data from a network can likewise receive the content data from a server peer node without the need of implementing a P2P content data sharing protocol stack, in these other embodiments, a legacy peer node sends a content request using standard protocol such as HTTP to a P2P content data overlay network just as they would normally send requests to a content server. However, the P2P content data overlay network determines the appropriate server peer nodes to serve the content data requests from the legacy peer nodes. Accordingly, the server peer node can then share the requested content data to the legacy peer node using standard protocols such as HTTP directly, or alternatively, the requested content data can be relayed by a P2P content data service proxy.

In this embodiment, a P2P content data overlay network 1208 comprises a P2P AS 1210, a plurality of server peer nodes (e.g., server peer nodes '1' 1214 and '2' 1216), and a P2P content data services proxy 1212. The P2P content data overlay network 1208 is connected to the Internet 502, or a network operator's IP-based network, which comprises a web portal 1206 and a content/cache server 1204 operable to provide content data. As shown in FIG. 12, the P2P content data services (CDS) proxy 1212 is likewise connected to the Internet 502, or a network operators IP-based network for access to the web portal 1206 and the content/cache server 1204.

Referring now to FIG. 12, the legacy peer node '3' 1218 is not implemented with a P2P content data sharing protocol stack. Accordingly, the legacy peer node '3' 1218 sends a content data request 1220, carried by a standard protocol like HTTP, to query the web portal 1206 for desired content data. In this and other embodiments, the web portal 1206 provides content data indexing, browsing and searching functionalities. In turn, the web portal 1206 responds 1222 with the requested content data source information including the address information of the P2P CDS proxy 1210. In this and other embodiments, the P2P CDS proxy 1212 functions as a gateway for the P2P content data overlay network.

The legacy peer node '3' 1218 then sends an HTTP request 1224 to the P2P CDS proxy 1210 for the desired content data. The P2P CDS proxy 1212 translates the HTTP content request to a P2P content request 1226, which is then sent to the P2P AS 1210. In turn, the P2P AS 1210 respectively sends P2P content data requests 1228 and 1230 to the server peer nodes '1' 1214 and '2' 1216. In response the server peer node '1' 1214 accepts 1232 the content data request while the server peer node '2' 1216 rejects 1234 the content data request. The P2P AS 1210 then responds 1236 to the P2P CDS proxy 1210 to acknowledge that server peer node '1' 1214 is able to provide the requested content data. In turn, the P2P CDS proxy 1212 translates the P2P ACK response 1236 to an HTTP ACK response 1240. The requested content data is then transferred 1242 from the server peer node '3' 1214 to the P2P CDS proxy 1212, which then transfers 1244 it to the legacy peer node '3' 1218.

Although the described exemplary embodiments disclosed herein are described with reference to performing peer-to-peer (P2P) data sharing operations between peer nodes in a wireless-enabled communications environment the present invention is not necessarily limited to the example embodiments which illustrate inventive aspects of the present invention that are applicable to a wide variety of authentication algorithms. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method, comprising:
    determining, at a peer node, state information of the peer node, the state information including a radio access type and a battery level;
    identifying a preferred peer mode based on the state information, wherein the preferred peer mode includes at least one of a server peer mode or a client peer mode;
    sending a message, to a peer-to-peer application server (P2P AS), indicating the preferred peer mode; and
    operating in the preferred peer mode.

2. The method of claim 1, wherein the P2P AS configures the preferred peer node with a default peer mode, and the default mode is the client peer mode.

3. The method of claim 2, wherein the message includes a value of a timer, and the P2P AS resets the preferred peer node to the default mode when the timer expires.

4. The method of claim 1, further comprising:
 detecting that the state information has been updated;
 identifying an updated preferred peer mode based on the updated state information; and
 sending a second message to the P2P AS indicating the updated preferred peer mode.

5. The method of claim 1, wherein the message is a registration message.

6. The method of claim 1, wherein the radio access type includes at least one of cellular or WiFi.

7. An apparatus, comprising:
 a memory; and
 at least one hardware processor communicatively coupled with the memory and configured to:
  determine, at a peer node, state information of the peer node, the state information including a radio access type and a battery level;
  identify a preferred peer mode based on the state information, wherein the preferred peer mode includes at least one of a server peer mode or a client peer mode;
  send a message, to a peer-to-peer application server (P2P AS), indicating the preferred peer mode; and
  operating in the preferred peer mode.

8. The apparatus of claim 7, wherein the P2P AS configures the preferred peer node with a default peer mode, and the default mode is the client peer mode.

9. The apparatus of claim 8, wherein the message includes a value of a timer, and the P2P AS resets the preferred peer node to the default mode when the timer expires.

10. The apparatus of claim 7, wherein at least one hardware processor is further configured to:
 detect that the state information has been updated;
 identify an updated preferred peer mode based on the updated state information; and
 send a second message to the P2P AS indicating the updated preferred peer mode.

11. The apparatus of claim 7, wherein the message is a registration message.

12. The apparatus of claim 7, wherein the radio access type includes at least one of cellular or WiFi.

13. A non-transitory computer-readable medium containing instructions which, when executed, cause a computing device to perform operations comprising:
 determining, at a peer node, state information of the peer node, the state information including a radio access type and a battery level;
 identifying a preferred peer mode based on the state information, wherein the preferred peer mode includes at least one of a server peer mode or a client peer mode;
 sending a message, to a peer-to-peer application server (P2P AS), indicating the preferred peer mode; and
 operating in the preferred peer mode.

14. The non-transitory computer-readable medium of claim 13, wherein the P2P AS configures the preferred peer node with a default peer mode, and the default mode is the client peer mode.

15. The non-transitory computer-readable medium of claim 14, wherein the message includes a value of a timer, and the P2P AS resets the preferred peer node to the default mode when the timer expires.

16. The non-transitory computer-readable medium of claim 13, wherein the operations further comprise:
 detecting that the state information has been updated;
 identifying an updated preferred peer mode based on the updated state information; and
 sending a second message to the P2P AS indicating the updated preferred peer mode.

17. The non-transitory computer-readable medium of claim 13, wherein the radio access type includes at least one of cellular or WiFi.

* * * * *